INVENTOR.
NOEL M. TORRES

Nov. 4, 1969         N. M. TORRES         3,476,421
STRUCTURAL JOINT ASSEMBLY
Filed July 18, 1968                     2 Sheets-Sheet 2

*INVENTOR.*
NOEL M. TORRES
BY *Knox & Knox*

United States Patent Office 3,476,421
Patented Nov. 4, 1969

3,476,421
STRUCTURAL JOINT ASSEMBLY
Noel M. Torres, 2826 Larkin Place,
San Diego, Calif. 92123
Filed July 18, 1968, Ser. No. 745,824
Int. Cl. F16b 1/00, 9/00, 17/00
U.S. Cl. 287—189.36
9 Claims

ABSTRACT OF THE DISCLOSURE

A joint for frame type structures utilizes a joint member having multiple keyway channels disposed at various angles around the body of the member, the frame being composed of key ended struts which snap into the channels of the joint member. Alongside each keyway channel are narrow slots which allow the side wall portions of the channels to spread and admit the struts, the slots also serving to hold locking elements which lock the struts securely in place. The structure is easily dismantled by simple hand held tools.

BACKGROUND OF THE INVENTION

The present invention relates to frame structures and specifically to a structural joint assembly.

In a framework built up from struts, rods, or the like, there are various types of joints used to secure groups of struts at a common connection. Some use special clamps and fittings which hold the struts at a specific angular relation, while others have a choice of certain preset angles. However, the variation in the latter type is usually limited to a single plane in the structure.

SUMMARY OF THE INVENTION

The structural joint described herein permits the interconnection of struts at a virtually unlimited combination of angles in any direction, each strut being snapped into place and being adjustable to final alignment. The joint member itself has circumferential keyway channels at predetermined angular separations, and struts can be inserted at any position along any channel. Alongside each channel are narrow slots which separate the sides of the channels into wall portions having sufficient resiliency to spread apart for insertion of a key end strut. Each strut is then locked in place by one or more simple locking elements inserted in the slots to prevent local deformation of the wall portions. Many different types of frame structures can be assembled with the one type of joint member and struts of suitable length with standardized keyed ends.

BRIEF DESCRIPTION OF THE DRAWINGS

Similar characters of reference indicate similar or identical elements and portions throughout the specification and throughout the views of the drawings.

DESCRIPTION OF THE PREFERRED EMBODIMENTS

Figure 1:
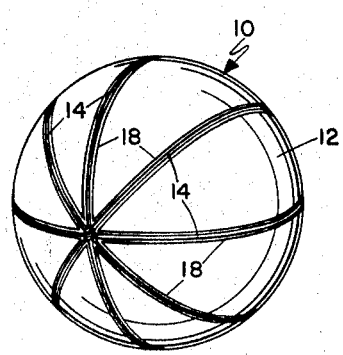
FIGURE 1 is a perspective view of the preferred form of the joint member.
Figure 2:
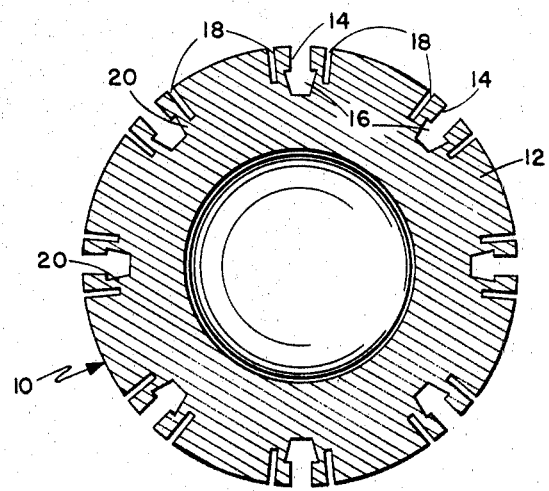
FIGURE 2 is an enlarged diametrical sectional view of the joint member.

The basic joint member 10, as in FIGURE 1, is shown as being of spherical form for simplicity and widest adaptability. It should be understood, however, that oblate spheroids, ellipsoids, or polygonal bodies may be used, or any other such configurations which will accommodate the novel strut retaining structure.

In large sizes the member 10 could be built up, but in the simple form shown has a unitary hollow body 12 of metal, plastic, or other suitable material, depending on the structure and stresses involved. The body 10 has a plurality of circumferential channels 14 radially indented into its surface, the channels being angularly separated and intersecting at a common axis through the body. Since the shape of the body 12 may vary, the term "radially" will be used herein as meaning "from the outside, generally toward the center of the body" or "outwardly opening." As illustrated, the channels are separated at 45 degree angles, but any convenient number of channels and angular separations may be used. The radially inward portion of each channel 14 has an undercut keyway preferably being tapered inwardly as shown.

Closely adjacent and parallel to the sides of each channel 14 are narrow slots 18, extending radially inwardly for a major portion of the depth of the channel and keyway. The wall portions 20 between the keyway 16 and slots 18 are thin and resilient enough to be bent forcibly outwardly to an extent limited by the width of the slots, while retaining sufficient strength to withstand expected tension and other loads on associated structural members. If the body 12 is of plastic material, the resiliency may be such that a single slot at one side of the channel is sufficient.

Figure 6:
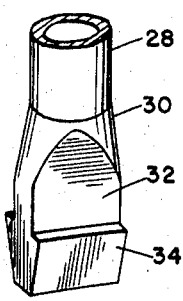
FIGURE 6 is a perspective view of one form of strut end.

The structural frame members are typified by a strut 22, shown as a tubular element with the end pressed to provide a flat portion 24 and an enlarged key head 26. Flat portion 24 is dimensioned to fit closely in channel 14 and head 26 fits the tapered shape of the keyway 16. The term strut is considered to include tubes, rods, extruded, or built up elements of metal or wood as may be used to assemble a frame structure, the simple tubular form shown merely being an example. An alternative strut arrangement is shown in FIGURE 6, in which the tubular strut 28 has a separately formed end fitting 30 with a flat portion 32 and an enlarged key head 34. The particular form will depend on the structure and strength requirements of the frame and the keyed configuration would apply to both ends of each strut.

Figure 3:
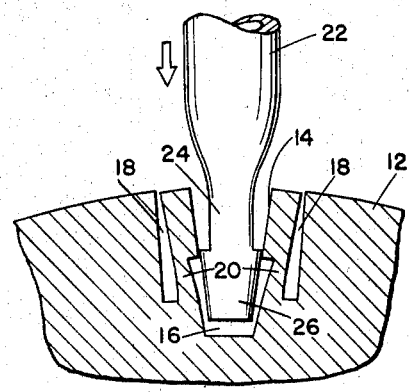
FIGURE 3 is a further enlarged sectional view of a single channel, showing insertion of a strut.

Connection of a strut to the joint member is shown in FIGURE 3. When the key head 26 is forced into channel 14, the wall portions 20 are bent outwardy until the key head passes into keyway 16. The wall portions will then snap back and the strut will be secured against removal. Flat portion 24 prevents rotation of the strut within the channels. For some assemblies a good fit of the strut in the channel may be sufficiently rigid, but for more rigidity and security it is desirable to lock the connection.

Figure 4:
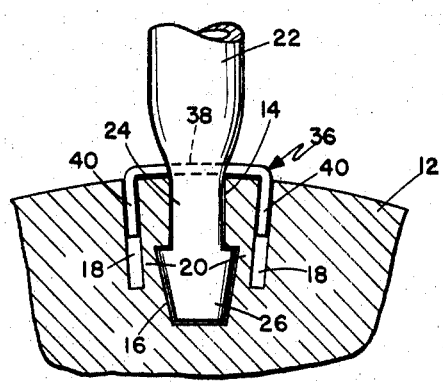
FIGURE 4 is a similar sectional view with the strut locked in place.
Figure 5:
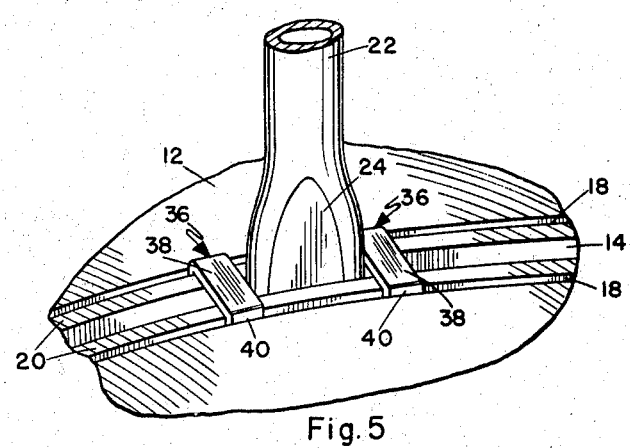
FIGURE 5 is a fragmentary perspective view of a typical locked strut connection.

With the strut seated into the joint member, as in FIGURES 4 and 5, the connection is secured by means of a frictionally held retaining element 36. As illustrated, the retaining element is an inverted U-shaped saddle clip having a bar portion 38 with end legs 40 which fit down into slots 18. The bar portion 38 straddles the channel 14 and the legs 40, by fitting tightly into the slots, prevent wall portions 20 from spreading under applied loads. A retaining element may be used at one or both ends of flat portion 24 and closely adjacent to each strut for maximum rigidity.

Figure 8:
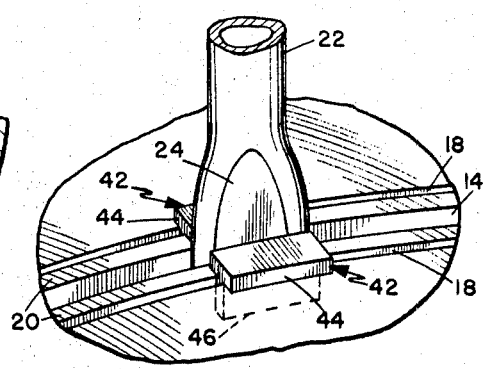
FIGURE 8 is a perspective view showing alternative strut locking means.

An alternative retaining element 42, shown in FIGURE 8, is particularly suitable when struts are too closely spaced in a common channel to allow the use of the saddle clip type. Retaining element 42 is T-shaped in cross section and has a bar portion 44, with a leg 46 which fits tightly into slot 18, the bar portion resting on the surface of the joint member on either side of the slot alongside flat portion 24. This type of retaining element is suitable for use with a plastic joint member having a single slot configuration, as mentioned above.

Figure 7:
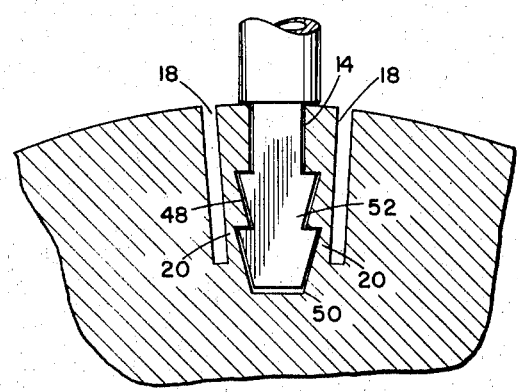
FIGURE 7 is a sectional view similar to FIGURE 4, showing an alternative keyed channel and strut configuration.

For high stress applications the structure shown in FIGURE 7 may be used. The arrangement is substantially the same as that described, except that the channel has stacked multiple keyways, two keyways 48 and 50 being shown as an example. The strut has a double keyed head 52 to fit the dual keyway and slots 18 are deepened to the inner keyway to facilitate insertion of the strut. This type of structure is commonly known as a fir tree joint and may incorporate any reasonable number of keyed elements. Locking of the joint is provided by retaining elements 36 or 42, as before.

Figure 10:
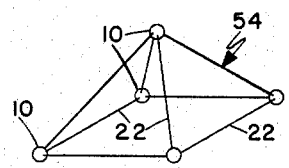
FIGURE 10 is a diagram of one form of structural module using the joint assembly.
Figure 11:
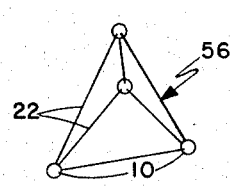
FIGURE 11 is a diagram of another modular form.
Figure 12:
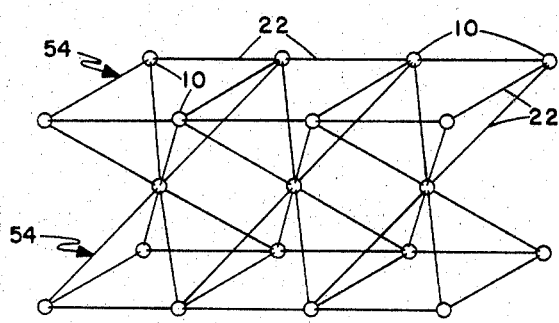
FIGURE 12 is a diagram of a typical frame assembly.

Assembly of a frame structure can be accomplished without tools, except perhaps for means to drive the retaining elements into place, since the struts are merely pressed into the joint member in the required position. The spherical joint member with completely circumferential channels will accommodate a large number of struts at many different angles in a complex structure. Conventional modular frame units are easily constructed, a square based pyramidal unit 54 being shown in FIGURE 10 and a triangular based unit 56 in FIGURE 11, as examples. A double layered frame structure using modular units 54 is shown in FIGURE 12, this type of structure not being possible with joint members limited to one plane of angular deviation. Many other types of structures can be constructed, such as domes, barrel vaults, hyperbolic paraboloids, geodetic frames and the like, of single or multiple layers.

Figure 9:
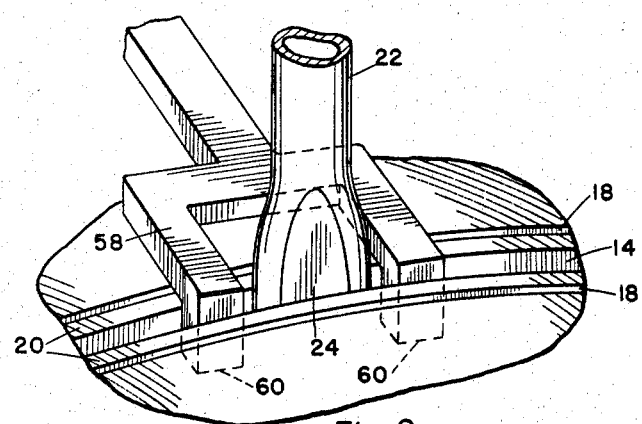
FIGURE 9 is a perspective view showing one technique for removing a strut.

The structure can be dismantled by first extracting the retaining elements by any suitable means, then spreading the channels to release the struts. A simple tool, shown in FIGURE 9, will open the channels easily. This comprises a fork 58 which straddles strut 22 and has prongs 60 which are inserted into and fit closely in channel 14. When the fork is inclined in either direction the prongs will separate the wall portions 20 and free the strut. Single struts can be released or adjusted in this manner without the necessity for loosening all structure at a joint member.

It is understood that minor variation from the form of the invention disclosed herein may be made without departure from the spirit and scope of the invention, and that the specification and drawings are to be considered as merely illustrative rather than limiting.

I claim:
1. A structural joint assembly, comprising at least one strut and a strut interconnecting joint member;
   said joint member having a body with at least one substatnially outwardly opening radially indented channel therein, said channel having a coextensive undercut keyway;
   said body having a narrow slot closely adjacent and parallel to at least one side of each of said channels, and defining a thin, substantially resilient wall portion between the slot and channel;
   said strut having a key headed end portion closely fitting said channel and keyway and being forcibly insertable into the keyway by deformation of said wall portion into said slot.

2. The structure of claim 1 and including a retaining element having a leg portion frictionally held in said slot adjacent the strut.

3. The structure of claim 1, wherein the depth of said slot is a major portion of the depth of said channel and keyway.

4. The structure of claim 1, wherein said body is substantially spherical with a plurality of channels similar to said channel, and said channels intersect at predetermined angular relations on a common axis of the body.

5. The structure of claim 1, wherein said strut has a flat portion closely fitting in said channel and preventing rotation of the strut therein.

6. The structure of claim 1, wherein said body is substantially spherical and has narrow slots on both sides of said channel, defining dual wall portions on opposite sides of the channel.

7. The structure of claim 6 and including a retaining element frictionally held in at least one of said slots adjacent the strut.

8. The structure of claim 7, wherein said retaining element is a saddle clip having a bar portion straddling said channel, with leg portions fitting closely into and frictionally held in said slots.

9. The structureof claim 7, wherein said retaining element is a generally T-shaped element having a leg portion fitting closely into and frictionally held in one of said slots adjacent the strut.

References Cited

UNITED STATES PATENTS

| 554,949 | 2/1896 | Nikoloff | 287—20.3 |
| 2,207,359 | 7/1940 | Shaw | 287—20.3 |
| 2,632,536 | 3/1953 | Skeel. | |
| 3,275,351 | 9/1966 | Fentiman | 287—189.36 |

FOREIGN PATENTS

| 325,997 | 4/1935 | Italy. |
| 538,930 | 2/1956 | Italy. |
| 809,689 | 8/1951 | Germany. |
| 1,191,179 | 4/1965 | Germany. |
| 121,639 | 5/1948 | Sweden. |
| 323,840 | 8/1957 | Switzerland. |

MARION PARSONS, Jr., Primary Examiner

U.S. Cl. X.R.

287—20.3